(12) United States Patent
Ishii

(10) Patent No.: US 12,145,679 B2
(45) Date of Patent: Nov. 19, 2024

(54) SUPPORT STRUCTURE FOR IN-VEHICLE COMPONENT

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 572 days.

(21) Appl. No.: 17/492,400

(22) Filed: Oct. 1, 2021

(65) Prior Publication Data

US 2022/0111921 A1 Apr. 14, 2022

(30) Foreign Application Priority Data

Oct. 9, 2020 (JP) ................................. 2020-171155

(51) Int. Cl.
*B62J 11/00* (2020.01)
*B62J 45/40* (2020.01)
*B62J 50/20* (2020.01)

(52) U.S. Cl.
CPC ............... *B62J 11/00* (2013.01); *B62J 45/40* (2020.02); *B62J 50/20* (2020.02)

(58) Field of Classification Search
CPC ............ B62J 11/00; B62J 45/40; B62J 50/20
See application file for complete search history.

(56) References Cited

U.S. PATENT DOCUMENTS 5,979,966 A * 11/1999 Suzuki .................. B62J 50/225
296/78.1
10,124,853 B2 * 11/2018 Iwamoto ................. B62M 7/02
11,059,539 B2 * 7/2021 Hariu ........................ B62J 1/08
11,092,121 B2 * 8/2021 Miki ......................... F01P 1/06
2016/0176467 A1 * 6/2016 Ishii ........................ B62K 11/04
180/219
2017/0015382 A1 * 1/2017 Takakuwa ............ F02M 35/162
2020/0398924 A1 * 12/2020 Kuroba ..................... B62J 17/02
2022/0111921 A1 * 4/2022 Ishii ......................... B62J 45/40
2022/0111922 A1 * 4/2022 Ishii ......................... B62J 6/027

FOREIGN PATENT DOCUMENTS

| EP | 0 869 052 A2 | 10/1998 |
|----|---|---|
| JP | H 10-273082 A | 10/1998 |
| JP | 2001-71964 A | 3/2001 |
| JP | 2016-117349 A | 6/2016 |
| WO | WO 2019/180941 A1 | 9/2019 |

OTHER PUBLICATIONS

European Extended Search Report dated Feb. 17, 2022, issued to European Application No. 21200262.0.
Office Action mailed Mar. 26, 2024, issued to corresponding Japanese Application No. 2020-171155.

* cited by examiner

*Primary Examiner* — Jacob B Meyer
(74) *Attorney, Agent, or Firm* — Stein IP, LLC

(57) ABSTRACT

There is provided a support structure for an in-vehicle component that supports an in-vehicle component at a front side of a vehicle body frame. The support structure for an in-vehicle component includes a first brace that is attached to a front portion of the vehicle body frame, and a second brace that is attached to a front portion of the first brace. The in-vehicle component is attached to the second brace, and the second brace is made of a material lighter in weight and higher in vibration damping rate than the first brace.

12 Claims, 9 Drawing Sheets

SUPPORT STRUCTURE FOR IN-VEHICLE COMPONENT

CROSS-REFERENCE TO RELATED APPLICATIONS

The disclosure of Japanese Patent Application No. 2020-171155 filed on Oct. 9, 2020, including specification, drawings and claims is incorporated herein by reference in its entirety.

BACKGROUND

The present invention relates to a support structure for an in-vehicle component.

As a support structure for an in-vehicle component, there is known a support structure that supports various in-vehicle components by a metal brace attached to a vehicle body frame (see, for example, Patent Literature 1). A metal brace disclosed in Patent Literature 1 extends forward from a head pipe of a vehicle body frame, a first bracket is welded to an intermediate portion in an extending direction of the brace, and a second bracket is welded to a front end of the brace. A headlamp or the like as an in-vehicle component is attached to the first bracket in a state of being exposed from a front cowl, and meters or the like as in-vehicle components are attached to the second bracket on an inner side of the front cowl.

Patent Literature 1: JP-A-2001-071964

SUMMARY

According to an advantageous aspect of the present invention, there is provided a support structure for an in-vehicle component according to an aspect of the present invention that supports an in-vehicle component at a front side of a vehicle body frame, the support structure including: a first brace that is attached to a front portion of the vehicle body frame; and a second brace that is attached to a front portion of the first brace, in which the in-vehicle component is attached to the second brace, and the second brace is formed of a material that is lighter in weight and higher in vibration damping rate than the first brace.

DETAILED DESCRIPTION OF EXEMPLIFIED EMBODIMENTS

In the support structure for an in-vehicle component disclosed in Patent Literature 1, due to attachment positions of the in-vehicle components or the like, a length of the metal brace in a front-rear direction is increased and a weight thereof is increased. In addition, there is a problem that vibration of an engine is easily transmitted from the vehicle body frame to the in-vehicle components via the brace.

The present invention has been made in view of the above, and an object thereof is to provide a support structure for an in-vehicle component capable of reducing a weight of a brace and suppressing vibration of an in-vehicle component.

A support structure for an in-vehicle component according to an aspect of the present invention supports an in-vehicle component at a front side of a vehicle body frame by a first brace and a second brace. The first brace is attached to a front portion of the vehicle body frame, the second brace is attached to a front portion of the first brace, and the in-vehicle component is attached to the second brace. The second brace far from the front portion of the vehicle body frame is formed of a material that is lighter in weight and higher in vibration damping rate than the first brace close to the front portion of the vehicle body frame. Therefore, even when lengths of the first and second braces in a front-rear direction are sufficiently secured, a total weight of the first and second braces is not excessively increased. In addition, even when vibration of the vehicle body frame is transmitted to the first brace, the vibration is damped by the second brace, so that vibration of the in-vehicle component is suppressed.

Figure 1:
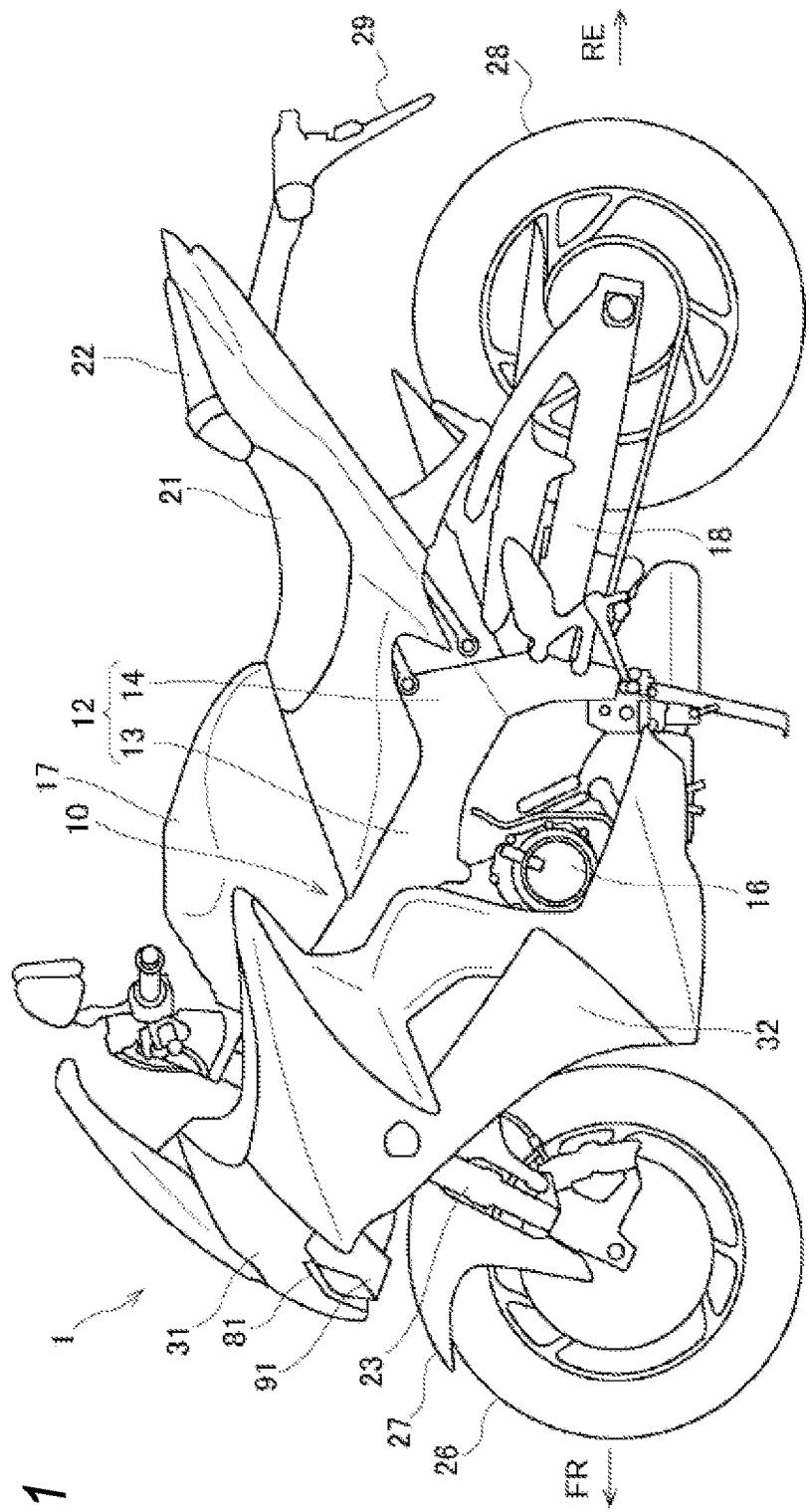
FIG. 1 is a left side view of a straddle-type vehicle according to the present embodiment.

Hereinafter, the present embodiment will be described in detail with reference to the accompanying drawings. FIG. 1 is a left side view of a straddle-type vehicle according to the present embodiment. In addition, in the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 includes various types of components such as an engine 16 and an electrical system that are mounted on a twin spar-type vehicle body frame 10 formed by aluminum casting. The vehicle body frame 10 includes a pair of main frames 12 branching from a head pipe 11 (see FIG. 2) to the left and right and extending toward the rear side, and a pair of down frames (not shown) branching from the head pipe 11 to the left and right and extending toward a lower side. A rear portion of the engine 16 is supported by the pair of main frames 12, and a front portion of the engine 16 is supported by the pair of down frames. By supporting the engine 16 with the vehicle body frame 10, rigidity of the entire vehicle is secured.

Front-side portions of the main frames 12 serve as tank rails 13 positioned above the engine 16, and a fuel tank 17 is supported by the tank rails 13. Rear-side portions of the main frames 12 serve as body frames 14 positioned behind the engine 16, and swing arms 18 are swingably supported at substantially middle positions of the body frames 14 in an up-down direction. Seat rails (not shown) and a back stay (not shown) extend toward the rear side from upper portions of the body frames 14. A rider seat 21 and a pillion seat 22 are supported on the seat rails on a rear side of the fuel tank 17.

A pair of front forks 23 are supported on the head pipe 11 via a steering shaft (not shown) so as to be steered. A front wheel 26 is rotatably supported by lower portions of the front forks 23, and an upper portion of the front wheel 26 is covered with a front fender 27. The swing arms 18 extend toward the rear side from the body frames 14. A rear wheel 28 is rotatably supported at rear ends of the swing arms 18, and an upper side of the rear wheel 28 is covered with a rear fender 29. The engine 16 is coupled to the rear wheel 28 via a chain drive type transmission mechanism, and power from the engine 16 is transmitted to the rear wheel 28 via the transmission mechanism.

A cowl brace 40 (see FIG. 2) is attached to the vehicle body frame 10, and the straddle-type vehicle 1 is covered with various types of covers supported by the cowl brace 40. For example, a front surface side of a vehicle front portion is covered with a front cowl 31, and side surface sides of the vehicle front portion are covered with a pair of side cowls 32. The cowl brace 40 supports a position lamp 81 and a pair of headlamps 91. The position lamp 81 is exposed at a center of the front cowl 31, and the pair of headlamps 91 are exposed on both left and right sides of the vehicle with the position lamp 81 sandwiched therebetween. Various types of in-vehicle components other than the lamps are also supported by the cowl brace 40.

In a general straddle-type vehicle, a cowl brace extends toward a front side from a head pipe, and a plurality of in-vehicle components such as a lamp are supported by the cowl brace on a vehicle front side. In order to secure strength against the load of the plurality of in-vehicle components, a metal material such as iron or aluminum is usually used for the cowl brace. In addition, as a size of the lamp is reduced, a length of the cowl brace in a front-rear direction from an attachment position of the lamp to the head pipe is increased. Therefore, when the length of the cowl brace in the front-rear direction is secured sufficiently, a weight of the cowl brace made of metal may be excessively increased.

Further, the cowl brace is formed of a metal material having a low vibration damping rate. Therefore, there is a problem that vibration of an engine is transmitted from the head pipe to the cowl brace, causing vibration of the in-vehicle components supported by the cowl brace. In this case, it is considered to form the cowl brace using a resin material that is lighter in weight and higher in vibration damping rate than the metal material, but it is necessary to obtain sufficient strength against a load acting on the cowl brace. In particular, since a large moment load acts on a base end side of the cowl brace, even a cowl brace made of resin may need an increased size in order to provide necessary strength, resulting in an increase in weight.

Figure 2:
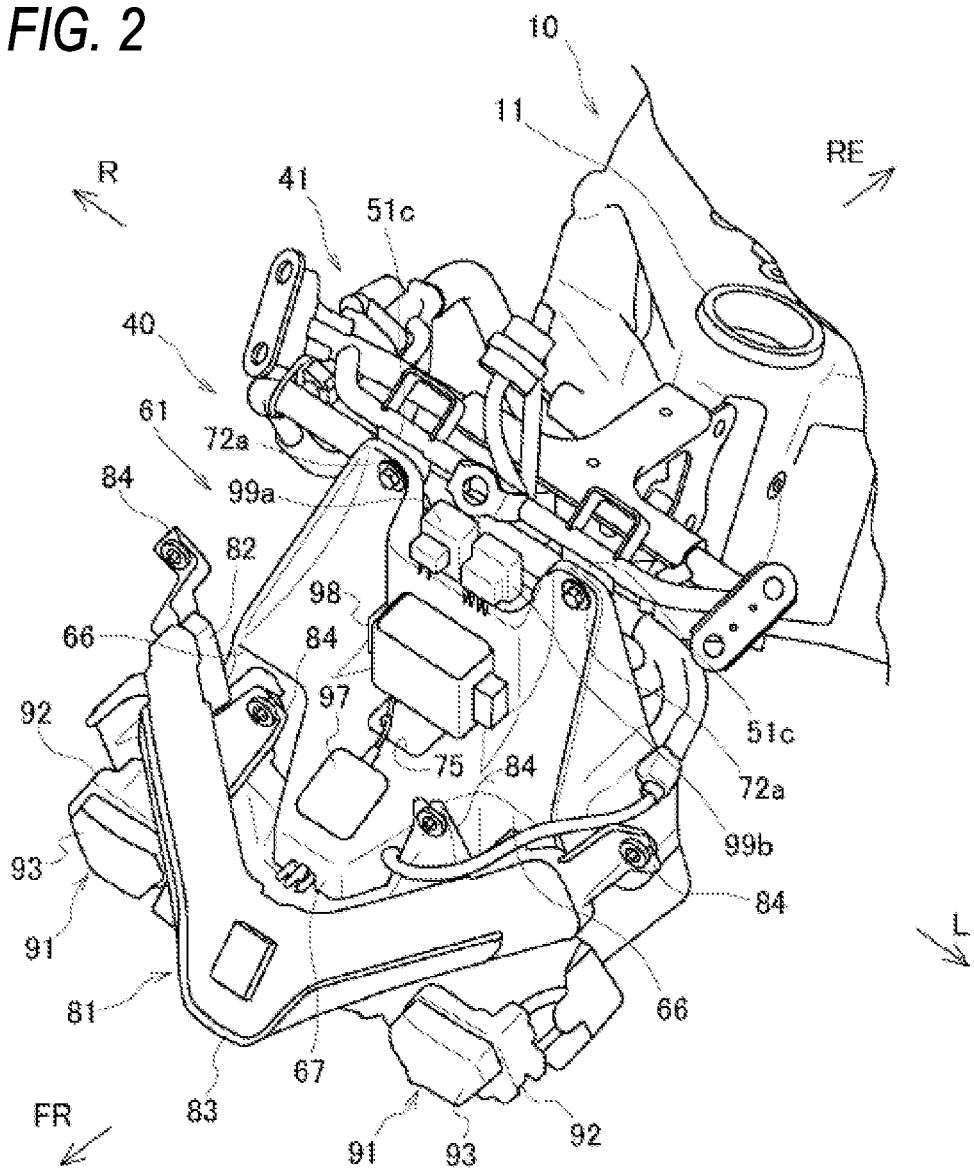
FIG. 2 is a perspective view of a periphery of a cowl brace according to the present embodiment.

Therefore, in the present embodiment, the cowl brace 40 is formed by combining a first brace 41 made of a metal having a high strength and a second brace 61 made of a resin having a light weight and a high vibration damping rate (see FIG. 2). By using the first brace 41 made of metal for a base end side of the cowl brace 40, it is possible to obtain sufficient strength against a load acting on the cowl brace 40. In addition, by using the second brace 61 made of resin for a front end side of the cowl brace 40, an increase in weight is suppressed even when a length of the cowl brace 40 in a front-rear direction is increased, and vibration of the in-vehicle components supported by the second brace 61 is suppressed.

Figure 3:
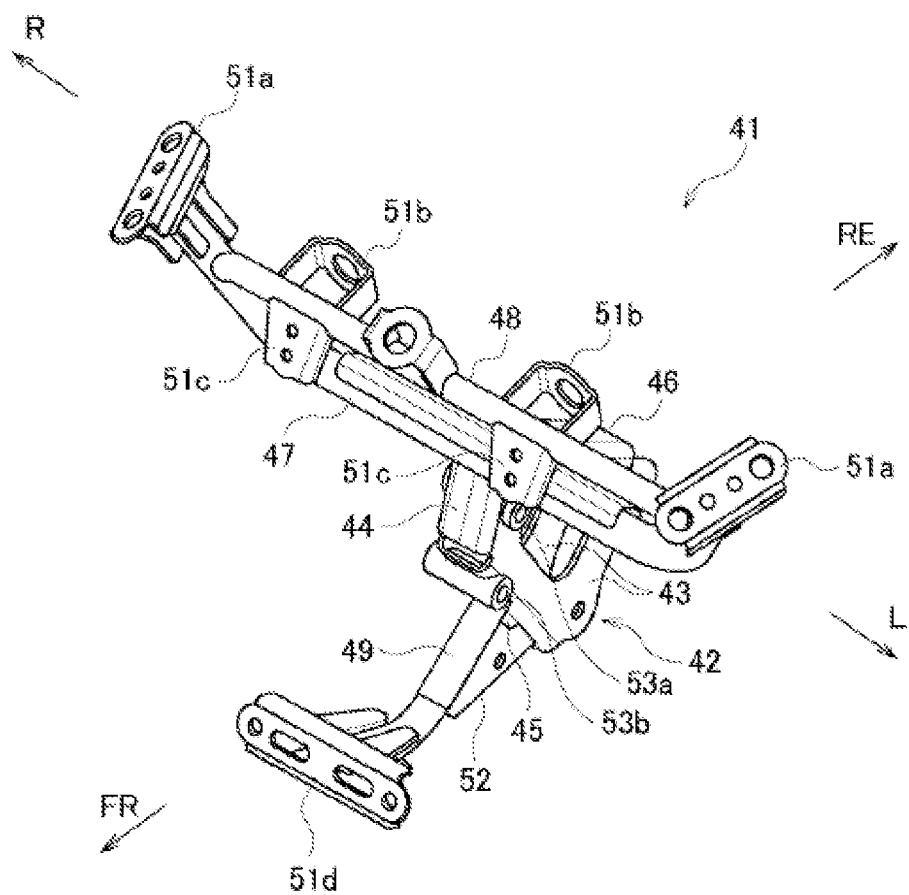
FIG. 3 is a perspective view of a first brace according to the present embodiment as viewed from a front side.
Figure 4:
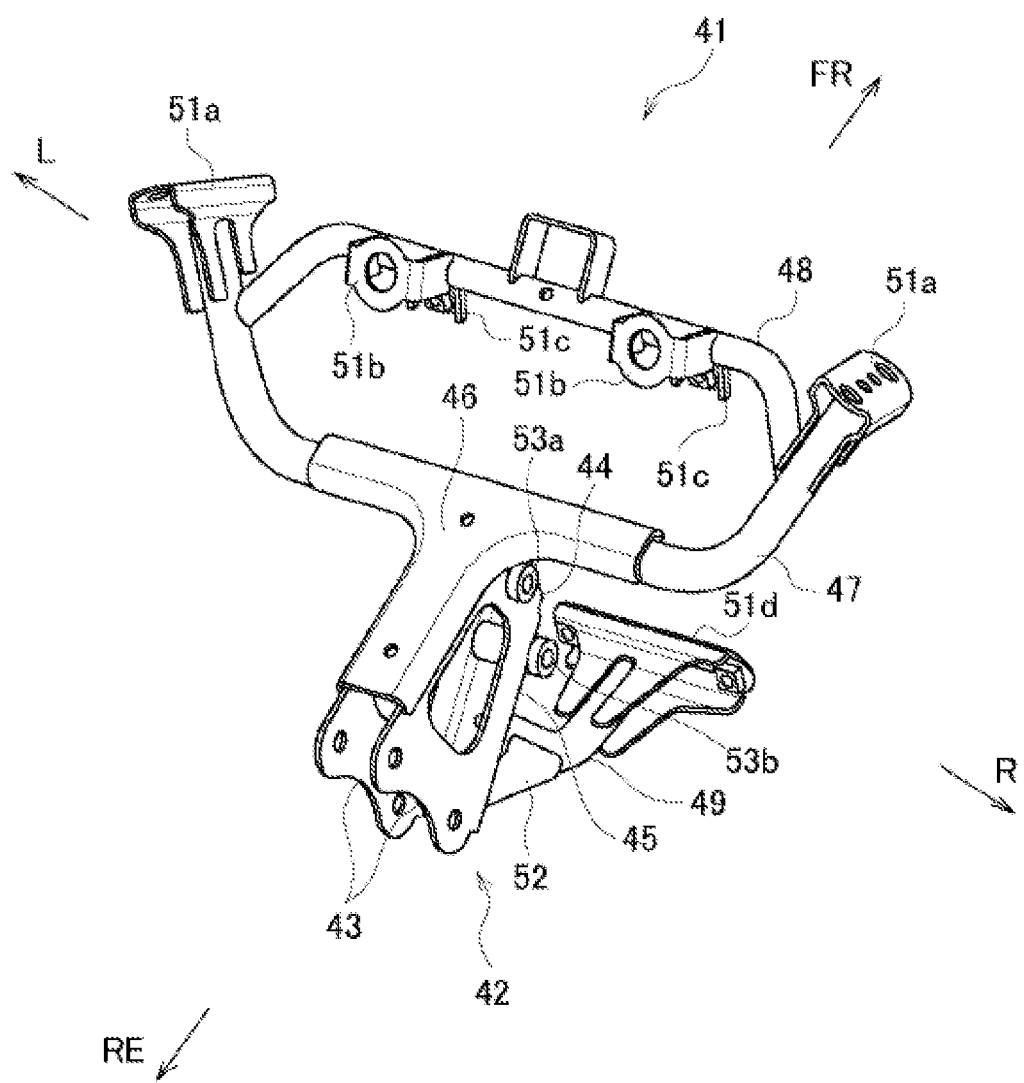
FIG. 4 is a perspective view of the first brace according to the present embodiment as viewed from a rear side.
Figure 5:
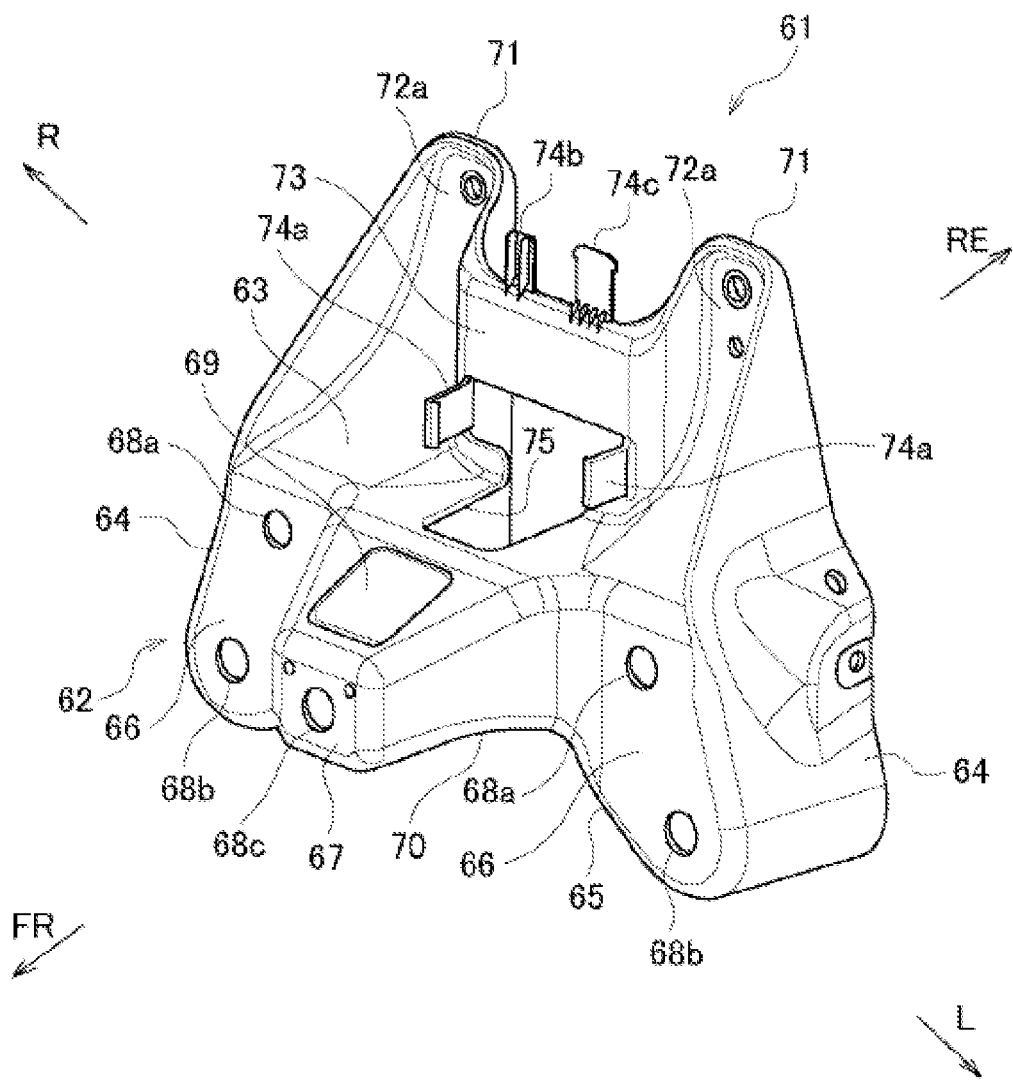
FIG. 5 is a perspective view of a second brace according to the present embodiment as viewed from a front side.
Figure 6:
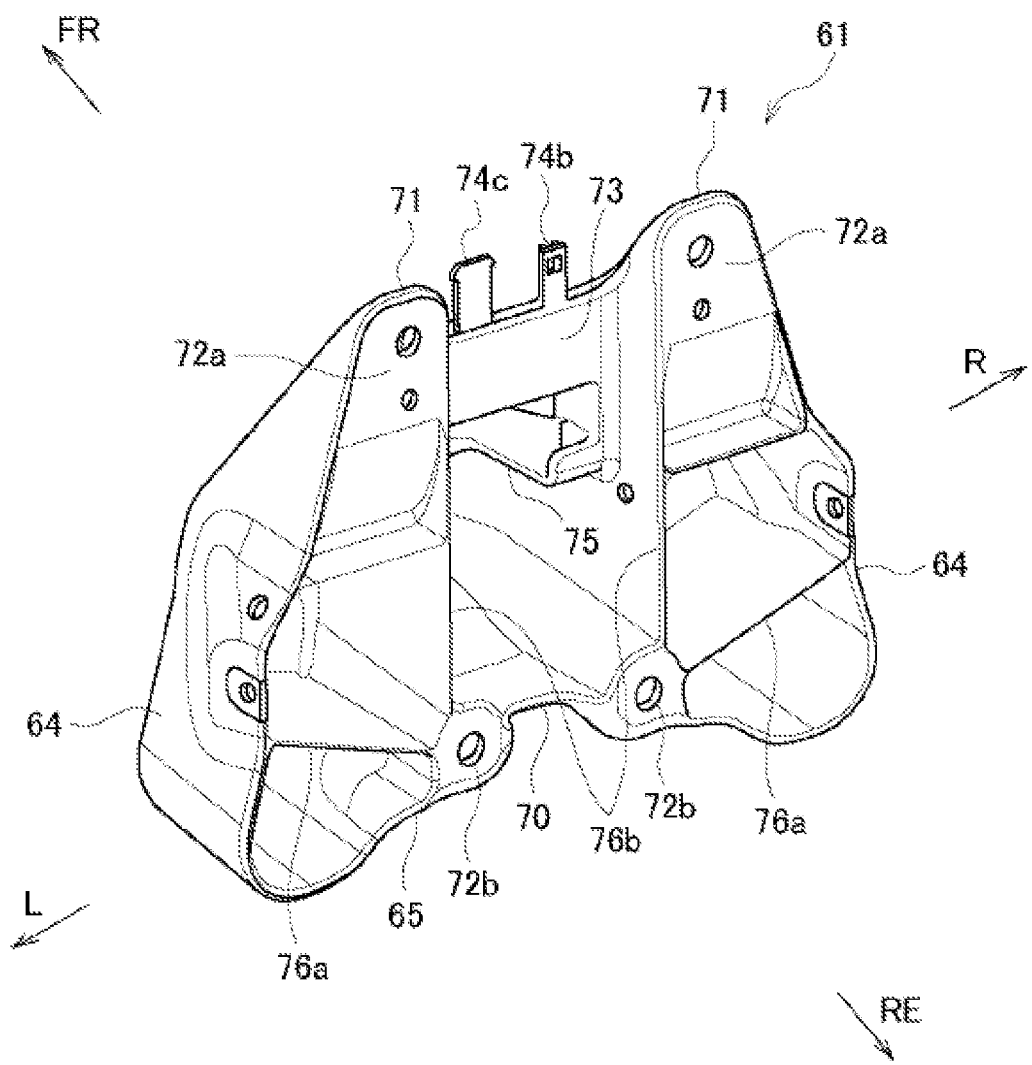
FIG. 6 is a perspective view of the second brace according to the present embodiment as viewed from a rear side.

Hereinafter, a cowl brace serving as a support structure for an in-vehicle component will be described with reference to FIGS. 2 to 6. FIG. 2 is a perspective view of a periphery of the cowl brace according to the present embodiment. FIG. 3 is a perspective view of a first brace according to the present embodiment as viewed from the front side. FIG. 4 is a perspective view of the first brace according to the present embodiment as viewed from the rear side. FIG. 5 is a perspective view of a second brace according to the present embodiment as viewed from the front side. FIG. 6 is a perspective view of the second brace according to the present embodiment as viewed from the rear side.

As illustrated in FIG. 2, the cowl brace 40 supports in-vehicle components at a front side of the vehicle body frame 10, on an inner side of the front cowl 31 (see FIG. 1). The cowl brace 40 includes the first brace 41 made of metal and attached to the head pipe 11, and the second brace 61 made of resin and attached to a front portion of the first brace 41. The first brace 41 is formed of a metal bracket, a metal pipe, or the like, and forms a framework on the base end side of the cowl brace 40. The second brace 61 is formed in a box shape that is open on a rear surface side, and various types of in-vehicle components are attached to an outer surface of the second brace 61.

For example, the position lamp 81 having a V-shape in a front view, which extends obliquely upward while extending from a center toward outer sides in a left-right direction, is attached to a front surface of the second brace 61, and the pair of headlamps 91 are attached below the position lamp 81. In the second brace 61, an electronic toll collection (ETC) antenna 97 is attached on a rear side of the position lamp 81. In addition, in the second brace 61, a local interconnect network (LIN) controller 98 is attached on a rear side of the ETC antenna 97, and relays 99a and 99b are attached on an upper side of the LIN controller 98. Details of attachment positions of these in-vehicle components will be described later.

As illustrated in FIGS. 3 and 4, the first brace 41 has a frame structure opened toward the front side. A rear-side frame-shaped frame 42 of the first brace 41 includes a pair of frame plates 43 facing each other in the left-right direction, a front plate 44 connecting front edges of the pair of frame plates 43, and a lower plate 45 connecting lower edges of the pair of frame plates 43. Rear frames of the pair of frame plates 43 serve as sandwiching plates that sandwich the head pipe 11. A T-shaped bracket 46 is fixed to upper edges of the pair of frame plates 43, and upper surfaces of the pair of frame plates 43 are covered by vertical plates of the T-shaped bracket 46 that are long in the front-rear direction. A front end side of the T-shaped bracket 46 serves as a transverse plate that is long in the left-right direction, and a U-shaped upper arm 47 is fixed to front portions of the pair of frame plates 43 via the transverse plate of the T-shaped bracket 46.

The upper arm 47 extends from the transverse plate of the T-shaped bracket 46, and extending portions of the upper arm 47 are curved toward the front side while expanding in the left-right direction. A pair of attachment brackets 51a for the front cowl 31 (see FIG. 1) are fixed to both ends of the upper arm 47. Portions of the upper arm 47 close to the pair of attachment brackets 51a are connected via an inverted U-shaped bridge 48. A pair of attachment brackets 51b for a meter unit (not shown) are fixed to a rear surface portion of the bridge 48 at a predetermined interval, and a pair of attachment brackets 51c for the second brace 61 are fixed to a front surface portion of the bridge 48 at a predetermined interval.

A lower arm 49 extends toward the front side from the lower plate 45 of the frame-shaped frame 42, and an attachment bracket 51d for the second brace 61 is fixed to a front end of the lower arm 49. The attachment bracket 51d is formed with an attachment surface that is long in the left-right direction. A reinforcing bracket 52 having a triangular shape in a side view and supporting a lower surface of the lower arm 49 is fixed to the lower plate 45 of the frame-shaped frame 42. Support portions 53*a* and 53*b* for a rectifier 100 (see FIG. 9) are provided on the front plate 44 and the lower plate 45 of the first brace 41. A space between the upper arm 47 and the lower arm 49 of the first brace 41 is used as an installation space for the rectifier 100.

As illustrated in FIGS. 5 and 6, the second brace 61 is molded with a resin material that is lighter in weight and higher in vibration damping rate than the first brace 41 (see FIG. 4), by using a mold for front and rear removal. The second brace 61 is formed in a box shape that is open in a rear surface, by a front wall portion 62 expanding in the left-right direction, an upper wall portion 63 extending toward the rear side from an upper edge of the front wall portion 62, a pair of side wall portions 64 extending toward the rear side from side edges of the front wall portion 62, and a bottom wall portion 65 extending toward the rear side from a lower edge of the front wall portion 62. A weight of the second brace 61 is reduced, and rigidity of the second brace 61 is improved. In addition, an installation space for peripheral components and wiring is secured on a rear surface side of the second brace 61.

The front wall portion 62 includes a pair of left-right front wall portions 66 positioned on both left and right sides, and a central front wall portion 67 protruding toward the front side from the pair of left-right front wall portions 66. Upper half portions of the pair of left-right front wall portions 66 serve as attachment surfaces on both end sides of the position lamp 81 (see FIG. 2), and attachment holes 68*a* for the position lamp 81 are formed in the attachment surfaces of the upper half portions. Lower half portions of the pair of left-right front wall portions 66 serve as attachment surfaces of the pair of headlamps 91 (see FIG. 2), and attachment holes 68*b* for the headlamps 91 are formed in the attachment surfaces of the lower half portions. The lower half portions of the pair of left-right front wall portions 66 protrude toward a lower side from the central front wall portion 67.

The central front wall portion 67 is formed in a bottomed cylindrical shape like a truncated pyramid. A front surface of the central front wall portion 67 serves as an attachment surface for a center of the position lamp 81, and an attachment hole 68*c* for the position lamp 81 is formed in the attachment surface of the front surface. An upper surface of the central front wall portion 67 is slightly recessed in a rectangular shape in a top view, and an attachment surface 69 for the ETC antenna 97 (see FIG. 2) is formed by the slight recess. A center of the bottom wall portion 65 is recessed toward an upper side, and the lower half portions of the pair of left-right front wall portions 66 protrude toward a lower side. With a recess 70 of the center, interference between a headlamp controller 96 (see FIG. 8) described later and the bottom wall portion 65 is avoided.

A pair of extending portions 71 extend toward an upper side from both left and right sides of the upper wall portion 63. Front surfaces of the pair of extending portions 71 are curved in a concave shape, and brace attachment portions 72*a* corresponding to the pair of attachment brackets 51*c* (see FIG. 3) of the first brace 41 are formed on upper end sides of the front surfaces of the pair of extending portions 71. Side surfaces of the pair of extending portions 71 on outer sides in the left-right direction are connected to the pair of side wall portions 64, and side surfaces of the pair of extending portions 71 on inner sides in the left-right direction are connected to each other via a connecting plate 73. Installation spaces for the LIN controller 98 (see FIG. 2) and the relays 99*a* and 99*b* (see FIG. 2) are formed between the pair of extending portions 71.

In this case, on a lower side of the connecting plate 73, a pair of attachment pieces 74*a* for the LIN controller 98 protrude toward the front side from side surfaces of the pair of extending portions 71 on inner sides in a vehicle width direction. The installation space for the LIN controller 98 is secured on a front surface side of the connecting plate 73. A pair of attachment pieces 74*b* and 74*c* for the relays 99*a* and 99*b* protrude toward an upper side from an upper edge of the connecting plate 73. The connecting plate 73 protrudes toward the front side, and the installation space for the relays 99*a* and 99*b* is secured on a rear surface side of the connecting plate 73. A center of the upper wall portion 63 is cut out, and wiring of the ETC antenna 97 and the LIN controller 98 is drawn to the rear surface side of the second brace 61 through a cutout 75.

The rear surface side of the second brace 61 is partitioned by a plurality of partition walls. A back surface side of each of the left-right front wall portions 66 is partitioned into upper and lower parts by a first partition wall portion 76*a*, and the back surface side of each of the left-right front wall portions 66 and a back surface side of the central front wall portion 67 are partitioned into left and right parts by a second partition wall portion 76*b*. With the first and second partition wall portions 76*a* and 76*b*, rigidity of the second brace 61 is improved. The first and second partition wall portions 76*a* and 76*b* are integrated on a bottom wall portion 65 side, and a pair of brace attachment portions 72*b* corresponding to the attachment bracket 51*d* (see FIG. 3) of the first brace 41 are formed at portions where the first and second partition wall portions 76*a* and 76*b* are integrated.

As described above, since the second brace 61 does not have an undercut, the second brace 61 can be easily resin-molded by a simple mold for front and rear removal. The rear surface side of the second brace 61 is formed in a hollow box shape to achieve weight reduction. Therefore, even when the second brace 61 is attached to the first brace 41 and the length of the cowl brace 40 in the front-rear direction is increased, a weight of the entire cowl brace 40 is not excessively increased. Further, since the second brace 61 is formed of a resin material having a high vibration damping rate, the vibration of the in-vehicle components attached to the second brace 61 is effectively suppressed.

Figure 7:
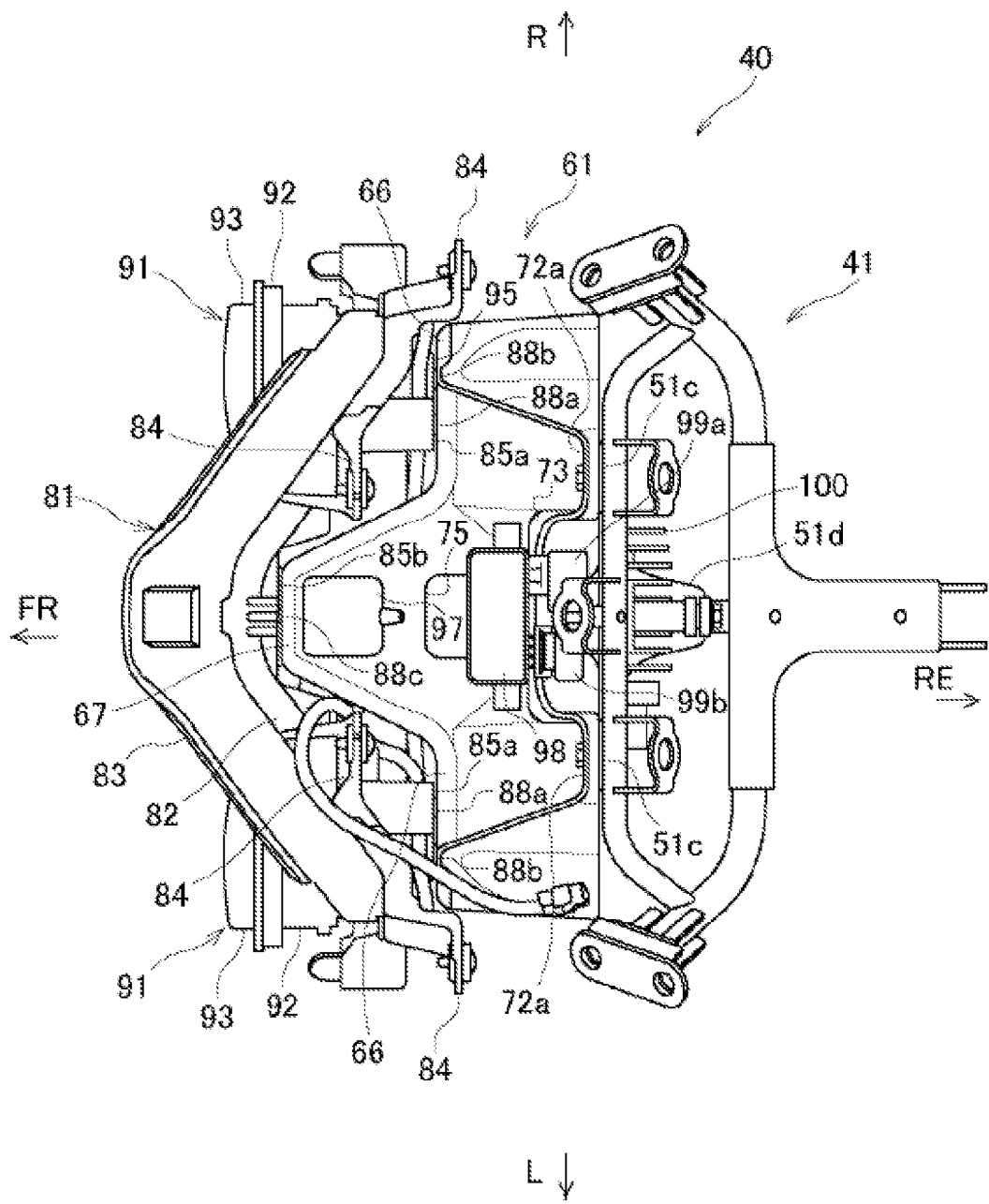
FIG. 7 is a top view of the cowl brace to which in-vehicle components are attached according to the present embodiment.
Figure 8:
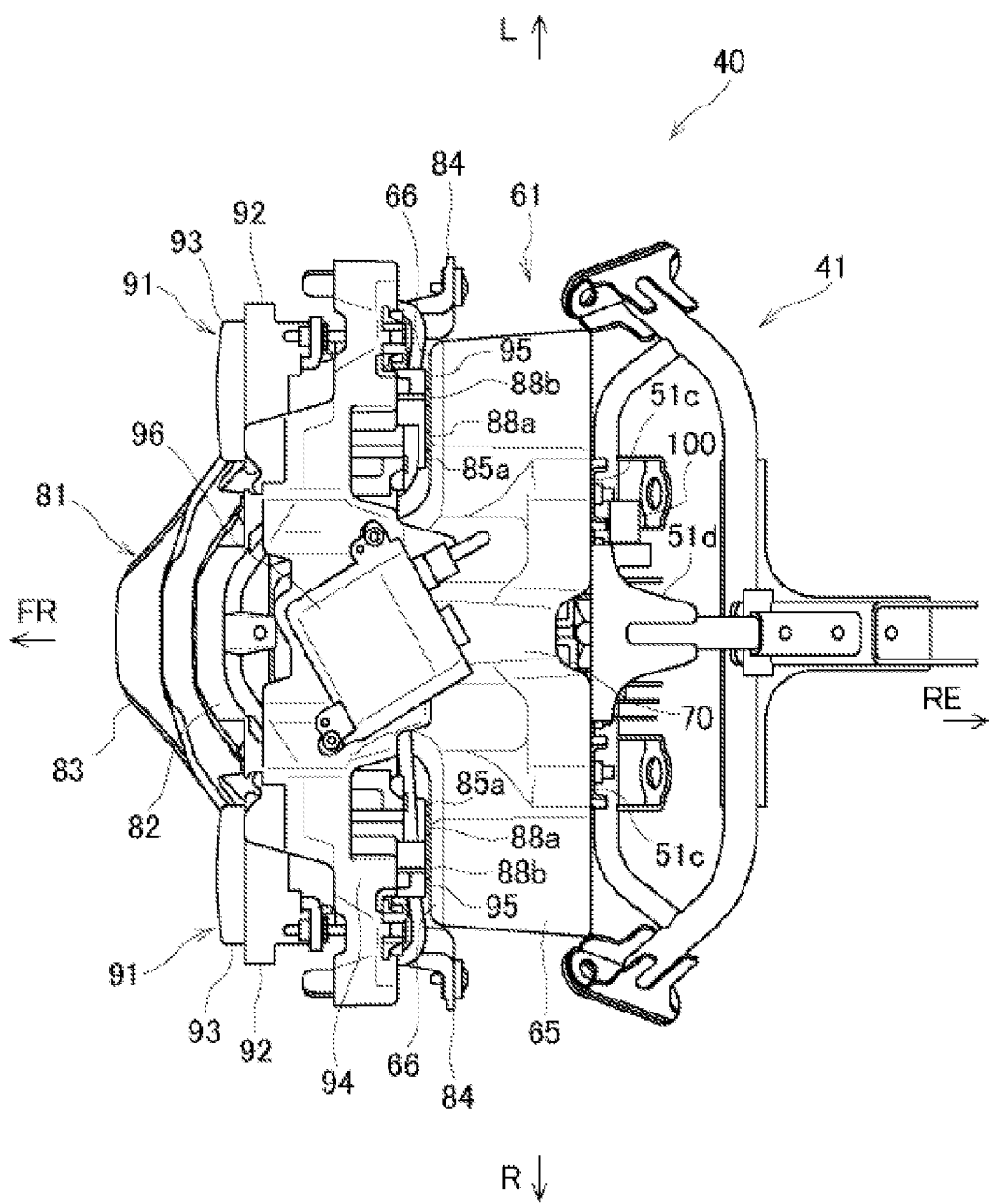
FIG. 8 is a bottom view of the cowl brace to which the in-vehicle components are attached according to the present embodiment.
Figure 9:
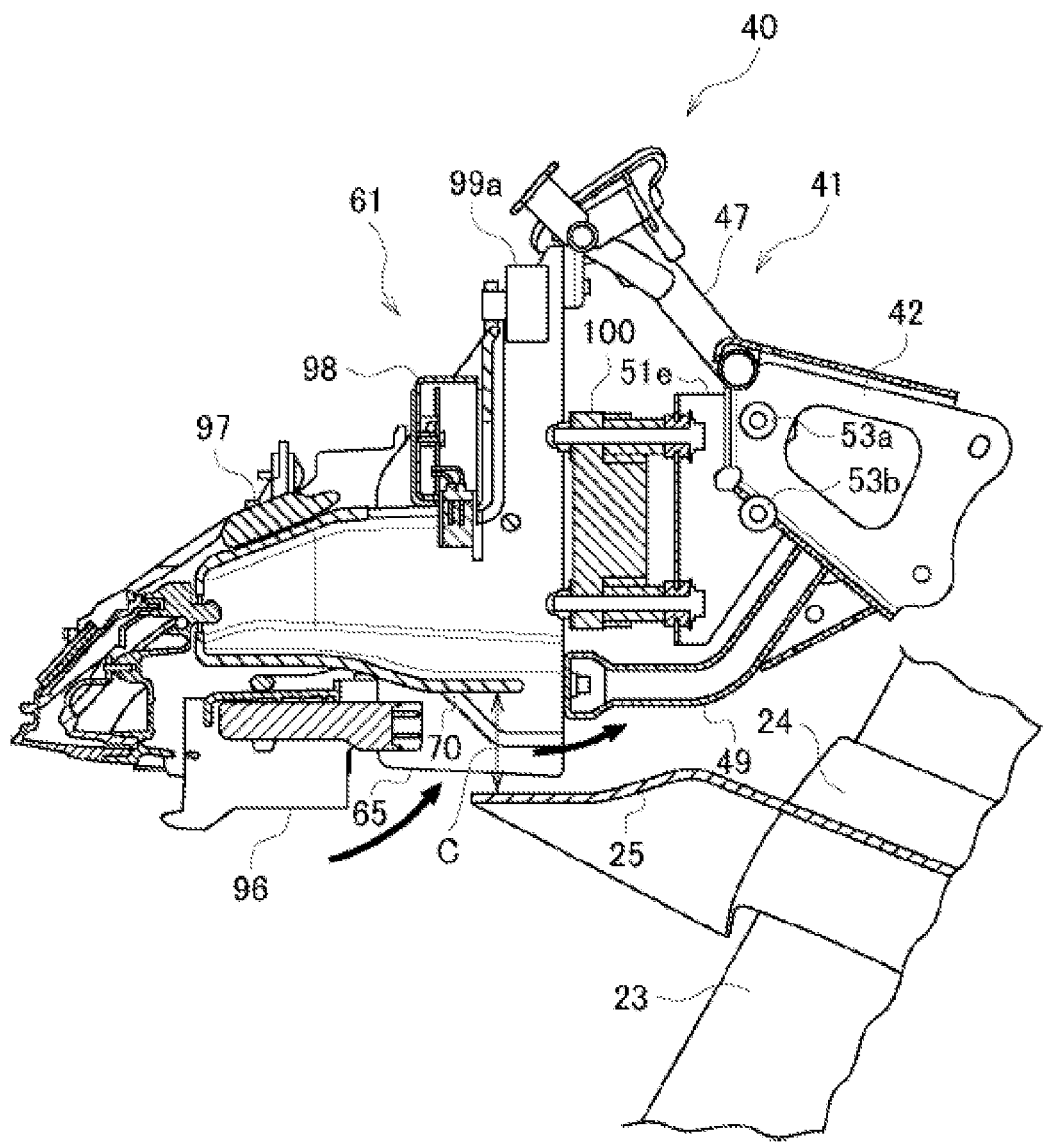
FIG. 9 is a longitudinal cross sectional view of the periphery of the cowl brace according to the present embodiment.

With reference to FIGS. 7 to 9, an attachment state of the in-vehicle components will be described. FIG. 7 is a top view of the cowl brace to which the in-vehicle components are attached according to the present embodiment. FIG. 8 is a bottom view of the cowl brace to which the in-vehicle components are attached according to the present embodiment. FIG. 9 is a longitudinal cross sectional view of the periphery of the cowl brace according to the present embodiment.

As illustrated in FIGS. 2, 7, and 8, the pair of brace attachment portions 72*a* of the second brace 61 are aligned with the pair of attachment brackets 51*c* of the first brace 41, and the pair of attachment brackets 51*c* and the brace attachment portions 72*a* are fixed by bolts. The pair of brace attachment portions 72*b* (see FIG. 6) of the second brace 61 are aligned with the attachment bracket 51*d* of the first brace 41, and both ends of the attachment bracket 51*d* and the pair of brace attachment portions 72*b* are fixed by bolts. The first brace 41 made of metal and the second brace 61 made of resin are connected to each other to form the cowl brace 40 that supports the front cowl 31 and the in-vehicle components.

The position lamp 81 extends toward the rear side while extending from the center in the left-right direction toward the outer sides in the left-right direction in a top view. In the position lamp 81, a lens cover 83 is fitted to an opening of a front surface of a position lamp case 82. The position lamp case 82 is provided with a plurality of attachment brackets 84 for attaching the position lamp 81 to the front cowl 31. On a rear surface side of the position lamp case 82, a pair of attachment surfaces 85a facing the pair of left-right front wall portions 66 of the second brace 61 are formed, and an attachment surface 85b facing the central front wall portion 67 of the second brace 61 is formed.

In each of the pair of attachment surfaces 85a of the position lamp case 82, a screw hole is formed. Rubber bushes 88a are fitted to the attachment holes 68a (see FIG. 5) of the pair of left-right front wall portions 66, and bolts inserted into the rubber bushes 88a are fixed to the screw holes of the attachment surfaces 85a. On the attachment surface 85b of the position lamp case 82, a projection is formed. A rubber bush 88c is fitted to the attachment hole 68c (see FIG. 5) of the central front wall portion 67, and the projection on the attachment surface 85b is fixed by being inserted into the rubber bush 88c. Since portions of the rubber bushes 88a and 88c protrude from front surfaces of the pair of left-right front wall portions 66 and the central front wall portion 67, a gap is formed between the position lamp case 82 and the second brace 61.

The pair of headlamps 91 are positioned on the outer sides in the left-right direction below the position lamp 81. In each of the headlamps 91, a lens cover 93 is fitted to an opening in a front surface of a headlamp case 92. Lower portions of the pair of headlamps 91 are connected by a plate-shaped connecting portion 94. The plate-shaped connecting portion 94 is positioned below the truncated-pyramid-like central front wall portion 67 of the second brace 61, and the headlamp controller 96 for controlling the pair of headlamps 91 is attached to a center of a lower surface of the plate-shaped connecting portion 94. The headlamp controller 96 is accommodated in the recess 70 of the bottom wall portion 65 of the second brace 61.

On a rear surface side of the plate-shaped connecting portion 94, a pair of attachment surfaces 95 are formed that face the pair of left-right front wall portions 66 of the second brace 61. In the pair of attachment surfaces 95 of the plate-shaped connecting portion 94, screw holes are formed. Rubber bushes 88b are fitted to the attachment holes 68b (see FIG. 5) of the pair of left-right front wall portions 66, and bolts inserted into the rubber bushes 88b are fixed to the screw holes of the attachment surfaces 95. Since portions of the rubber bushes 88b protrude from the front surfaces of the pair of left-right front wall portions 66, a gap is formed between the plate-shaped connecting portion 94 and the second brace 61. As described above, the position lamp 81 and the pair of headlamps 91 are floatingly supported by the second brace 61 via the rubber bushes 88a to 88c.

The ETC antenna 97 that transmits and receives toll information to and from a roadside antenna is attached to the attachment surface 69 on the upper surface of the truncated-pyramid-like central front wall portion 67. By attaching the ETC antenna 97 at a front end side of the second brace 61, it is possible to smoothly pass through a toll gate by transmitting and receiving the toll information at a front portion of the straddle-type vehicle 1 in a traveling direction. The LIN controller 98 for controlling LIN communication is attached to the pair of attachment pieces 74a (see FIG. 5) on the rear side of the ETC antenna 97. The wiring of the ETC antenna 97 and the LIN controller 98 is drawn through the cutout 75 of the second brace 61 to the rear surface side of the second brace 61.

The connecting plate 73 is positioned on the rear side of the LIN controller 98, and the relays 99a and 99b are attached to the pair of attachment pieces 74b and 74c (see FIG. 5) on the connecting plate 73. Main body portions of the relays 99a and 99b are accommodated on the rear surface side of the connecting plate 73. As described above, the in-vehicle components such as the position lamp 81, the pair of headlamps 91, the headlamp controller 96, the ETC antenna 97, the LIN controller 98, and the relays 99a and 99b are attached to the second brace 61. Therefore, even when vibration of the engine 16 is transmitted to the first brace 41, the vibration is damped by the second brace 61 and the rubber bushes 88a to 88c, and thus the vibration of the in-vehicle components is suppressed.

In particular, the attachment positions of the position lamp 81 are dispersed in the front-rear and left-right directions following the pair of left-right front wall portions 66 and the central front wall portion 67. Therefore, even when the position lamp 81 is formed to be long in the left-right direction, vibration of the position lamp 81 is effectively suppressed by using three attachment positions. Installation spaces for the headlamp controller 96, the ETC antenna 97, the LIN controller 98, and the relays 99a and 99b are provided at a center in the left-right direction of the second brace 61. Accordingly, weight distribution of a vehicle body is brought close to even in the left-right direction, and thus steering stability is improved.

Further, since the plurality of in-vehicle components are attached to the second brace 61, a load (moment load) of the plurality of in-vehicle components acting on the first brace 41, which is closer to the vehicle body frame 10 than the second brace 61, is increased. Since a metal material is used for the first brace 41, the strength of the first brace 41 against the load of the plurality of in-vehicle components is sufficiently secured. Since a resin material having a smaller specific gravity than a metal material is used for the second brace 61, weight reduction can be achieved in a state where the length of the cowl brace 40 in the front-rear direction is sufficiently secured. Further, a degree of freedom in designing the second brace 61 is improved.

As illustrated in FIG. 9, the upper arm 47 of the first brace 41 extends obliquely upward while extending toward the front side from the frame-shaped frame 42, and the lower arm 49 of the first brace 41 extends obliquely downward while extending toward the front side from the frame-shaped frame 42. The installation space for the rectifier 100 is secured on the rear side of the second brace 61 between the upper arm 47 and the lower arm 49. The rectifier 100 is attached to the support portions 53a and 53b of the frame-shaped frame 42 via an attachment bracket 51e. The rectifier 100 rectifies AC power generated by an alternator (not shown) into DC power.

Since a general cowl brace is formed by welding a metal bracket, a metal pipe, and the like, a shape of the cowl brace is complicated, and an installation space for a rectifier cannot be secured in the brace. Therefore, in the general cowl brace, the rectifier is attached outside the brace. In the cowl brace 40 of the present embodiment, since the first brace 41 and the second brace 61 are divided into front and rear parts, a relatively large installation space is secured in the brace, and even a large-sized in-vehicle component such as the rectifier 100 can be attached to a center of the brace.

As described above, the center in the left-right direction of the bottom wall portion 65 of the second brace 61 is recessed toward the upper side, and the recess 70 of the bottom wall portion 65 extends in a vehicle body front-rear direction. A lower bracket cover 25 that covers a lower bracket 24 is attached to the front forks 23 so as to overlap the recess 70 of the bottom wall portion 65 from below. A gap C is formed between the recess 70 of the bottom wall portion 65 and the lower bracket cover 25, and an air guide path through which air is introduced into the cowl brace 40 during traveling of the vehicle is formed by the gap C. Accordingly, the air flowing in from the front side of the vehicle body during traveling of the vehicle easily flows rearward smoothly, and thus heat dissipation is promoted and accumulation of heat by the head lamp 91, the rectifier 100, and the like is alleviated.

The rectifier 100 is positioned at the center in the left-right direction of the second brace 61, similarly to the headlamp controller 96, the LIN controller 98, the ETC antenna 97, and the relays 99*a* and 99*b*. In a general brace made of a metal bracket or a metal pipe, a size of the brace is increased in order to secure an installation space at a center in a left-right direction and a weight thereof is increased. However, in the cowl brace 40 of the present embodiment, the first brace 41 made of metal and the second brace 61 made of resin are combined. A shape of the brace is designed to match the in-vehicle components, and the installation spaces for the various types of in-vehicle components are secured at the center in the left-right direction.

As described above, according to the present embodiment, the second brace 61 far from the front portion of the vehicle body frame 10 is formed of a material that is lighter in weight and higher in vibration damping rate than the first brace 41 close to the front portion of the vehicle body frame 10. Therefore, even when the length of the cowl brace 40 in the front-rear direction, which includes the first brace 41 and the second brace 61, is sufficiently secured, a total weight of the cowl brace 40 is not excessively increased. In addition, even when vibration of the vehicle body frame 10 is transmitted to the first brace 41, the vibration is damped by the second brace 61, so that vibration of the in-vehicle components is suppressed.

Although a position lamp, a headlamp, a headlamp controller, an ETC antenna, a LIN controller, and a relay are exemplified as in-vehicle components in the present embodiment, the in-vehicle component is not particularly limited. For example, the in-vehicle component may be a vehicle controller. In addition, the in-vehicle component is not limited to an electrical component, and the in-vehicle component may be a stay of a side mirror.

Further, although the position lamp is attached to a front wall portion of a second brace in the present embodiment, an object detector such as a radar for detecting an object in front of the vehicle body may be attached in a case where the position lamp is not attached to the front wall portion of the second brace.

Further, although a rectifier is attached to a first brace in the present embodiment, the rectifier may be attached to a rear surface side of the second brace.

Further, although the position lamp is formed to be long in a left-right direction in the present embodiment, the position lamp may be separated into a left-side part and a right-side part.

Further, although a pair of headlamps are integrated via a plate-shaped connecting portion in the present embodiment, the pair of headlamps may be separated.

Further, although the first brace is formed of a metal material and the second brace is formed of a resin material in the present embodiment, it is sufficient as long as the second brace is formed of a material that is lighter in weight and higher in vibration damping rate than the first brace. Therefore, the first brace may be formed of a material other than a metal material, and the second brace may be formed of a material other than a resin material.

In addition, the support structure for an in-vehicle component according to the present embodiment is not limited to the straddle-type vehicle illustrated in the drawings, and may be adopted in other types of straddle-type vehicles. The straddle-type vehicle is not limited to a general vehicle that a rider rides in a posture of straddling a seat, and further includes a scooter-type vehicle that a rider rides without straddling a seat.

As described above, a support structure (cowl brace 40) for an in-vehicle component according to the present embodiment is a support structure for an in-vehicle component that supports an in-vehicle component at a front side of a vehicle body frame (10), and includes a first brace (41) attached to a front portion of the vehicle body frame and a second brace (61) attached to a front portion of the first brace. The in-vehicle component is attached to the second brace, and the second brace is formed of a material that is lighter in weight and higher in vibration damping rate than the first brace. According to this configuration, the second brace far from the front portion of the vehicle body frame is formed of a material that is lighter in weight and higher in vibration damping rate than the first brace close to the front portion of the vehicle body frame. Therefore, even when lengths of the first and second braces in the front-rear direction are sufficiently secured, a total weight of the first and second braces is not excessively increased. In addition, even when vibration of the vehicle body frame is transmitted to the first brace, the vibration is damped by the second brace, so that vibration of the in-vehicle component is suppressed.

Further, in the support structure for an in-vehicle component according to the present embodiment, the second brace includes a front wall portion (62) that expands in a left-right direction, an upper wall portion (63) that extends toward a rear side from an upper edge of the front wall portion, and a side wall portion (64) that extends toward a rear side from a side edge of the front wall portion. According to this configuration, rigidity of the second brace is improved by the front wall portion, the upper wall portion, and the side wall portion, and an accommodation space for the in-vehicle component and wiring is secured on a rear surface side of the second brace.

Further, in the support structure for an in-vehicle component according to the present embodiment, the second brace includes a bottom wall portion (65) that extends toward a rear side from a lower edge of the front wall portion. According to this configuration, the rigidity of the second brace is further improved by the front wall portion, the upper wall portion, the side wall portion, and the bottom wall portion.

Further, in the support structure for an in-vehicle component according to the present embodiment, the in-vehicle component is a lamp (position lamp 81) that extends toward a rear side while extending from a center in the left-right direction toward an outer side in the left-right direction, the front wall portion is formed with a pair of left-right front wall portions (66) to which left and right sides of the lamp are attached and a central front wall portion (67) to which a center of the lamp is attached, and the central front wall portion protrudes toward a front side from the pair of left-right front wall portions. According to this configuration, attachment positions of the lamp are dispersed in front-rear and left-right directions by the pair of left-right front wall portions and the central front wall portion. Even when the lamp is formed to be long in the left-right direction, swaying of the lamp is suppressed by using three attachment positions.

Further, in the support structure for an in-vehicle component according to the present embodiment, the central front wall portion is formed in a cylindrical shape. According to this configuration, a weight of a central attachment portion is reduced, and rigidity of the central attachment portion is improved.

Further, in the support structure for an in-vehicle component according to the present embodiment, the central front wall portion is formed in a bottomed cylindrical shape that is open on a rear surface side, and the center of the lamp is attached to a front surface of the central front wall portion. According to this configuration, rigidity of the central attachment portion is further improved.

Further, in the support structure for an in-vehicle component according to the present embodiment, the second brace has a pair of extending portions (71) that extend toward an upper side from both left and right sides of the upper wall portion, the pair of extending portions are attached to the first brace, and an installation space for the in-vehicle component is formed between the pair of extending portions. According to this configuration, weight distribution of a vehicle body is brought close to even in the left-right direction, and thus steering stability is improved.

Further, in the support structure for an in-vehicle component according to the present embodiment, the in-vehicle component is a communication device (ETC antenna 97). According to this configuration, it is possible to communicate with an external device on the front side of the vehicle body, and vibration of the communication device is suppressed.

Further, in the support structure for an in-vehicle component according to the present embodiment, the in-vehicle component is an object detector. According to this configuration, an object in front of the vehicle body can be detected, and vibration of the object detector is suppressed.

Further, in the support structure for an in-vehicle component according to the present embodiment, the first brace is formed of a metal material, and the second brace is formed of a resin material. According to this configuration, since a metal material is used for the first brace, strength against a load acting on the first brace is increased. In addition, since a resin material is used for the second brace, a degree of freedom in designing the second brace is improved.

Although the present embodiment has been described, the above-described embodiment and a modification may be combined in whole or in part as another embodiment.

The technique of the present invention is not limited to the above-described embodiment, and various changes, substitutions, and modifications may be made without departing from the spirit of the technical idea of the present invention. The present invention may be implemented using other methods as long as the technical idea can be implemented by the methods through advance of the technology or other derivative technology. Accordingly, the claims cover all embodiments that may be included within the scope of the technical idea.

What is claimed is:

1. A support structure that supports an in-vehicle component at a front side of a vehicle body frame, the support structure comprising:
    a first brace that is attached to a front portion of the vehicle body frame; and
    a second brace that is attached to a front portion of the first brace, wherein
    the in-vehicle component is attached to the second brace,
    the second brace is made of a material lighter in weight and higher in vibration damping rate than the first brace,
    the second brace includes a front wall portion that expands in a left-right direction of a vehicle, an upper wall portion that extends toward a rear side from an upper edge of the front wall portion, and a side wall portion that extends toward a rear side from a side edge of the front wall portion, and
    the second brace is formed in a box shape that is open in a rear surface.

2. The support structure for an in-vehicle component according to claim 1, wherein
    the second brace includes a bottom wall portion that extends toward a rear side from a lower edge of the front wall portion.

3. The support structure for an in-vehicle component according to claim 1, wherein
    the in-vehicle component is a lamp that extends toward a rear side while extending from a center in the left-right direction toward an outer side in the left-right direction,
    the front wall portion is formed with a pair of left-right front wall portions to which both left and right sides of the lamp are attached, and a central front wall portion to which a center of the lamp is attached, and
    the central front wall portion protrudes toward a front side from the pair of left-right front wall portions.

4. The support structure for an in-vehicle component according to claim 3, wherein
    the central front wall portion has a cylindrical shape.

5. The support structure for an in-vehicle component according to claim 3, wherein
    the central front wall portion has a bottomed cylindrical shape that is open on a rear surface side, and the center of the lamp is attached to a front surface of the central front wall portion.

6. The support structure for an in-vehicle component according to claim 1, wherein
    the second brace includes a pair of extending portions that extend toward an upper side from both left and right sides of the upper wall portion, and
    the pair of extending portions are attached to the first brace, and an installation space for the in-vehicle component is formed between the pair of extending portions.

7. The support structure for an in-vehicle component according to claim 1, wherein
    the in-vehicle component is a communication device.

8. The support structure for an in-vehicle component according to claim 1, wherein
    the in-vehicle component is an object detector.

9. The support structure for an in-vehicle component according to claim 1, wherein
    the first brace is formed of a metal material, and the second brace is formed of a resin material.

10. The support structure according to claim 1, wherein the front wall portion includes a pair of left-right front wall portions positioned on both left and right sides, and a central front wall portion protruding toward the front side from the pair of left-right front wall portions; and wherein an attachment surface facing upward toward a vehicle body is formed on an upper surface of the central front wall portion, and an antenna is attached to the attachment surface.

11. A support structure for an in-vehicle component that supports an in-vehicle component at a front side of a vehicle body frame, the support structure comprising:
- a first brace that is attached to a front portion of the vehicle body frame; and
- a second brace that is attached to a front portion of the first brace, wherein
- the in-vehicle component is attached to the second brace,
- the second brace is made of a material lighter in weight and higher in vibration damping rate than the first brace, wherein
- the second brace includes a front wall portion that expands in a left-right direction of a vehicle, an upper wall portion that extends toward a rear side from an upper edge of the front wall portion, and a side wall portion that extends toward a rear side from a side edge of the front wall portion,
- the in-vehicle component is a lamp that extends toward a rear side while extending from a center in the left-right direction toward an outer side in the left-right direction,
- the front wall portion is formed with a pair of left-right front wall portions to which both left and right sides of the lamp are attached, and a central front wall portion to which a center of the lamp is attached, and
- the central front wall portion protrudes toward a front side from the pair of left-right front wall portions.

12. A support structure for an in-vehicle component that supports an in-vehicle component at a front side of a vehicle body frame, the support structure comprising:
- a first brace that is attached to a front portion of the vehicle body frame; and
- a second brace that is attached to a front portion of the first brace, wherein
- the in-vehicle component is attached to the second brace,
- the second brace is made of a material lighter in weight and higher in vibration damping rate than the first brace, wherein
- the second brace includes a front wall portion that expands in a left-right direction of a vehicle, an upper wall portion that extends toward a rear side from an upper edge of the front wall portion, and a side wall portion that extends toward a rear side from a side edge of the front wall portion,
- the second brace includes a pair of extending portions that extend toward an upper side from both left and right sides of the upper wall portion, and
- the pair of extending portions are attached to the first brace, and an installation space for the in-vehicle component is formed between the pair of extending portions.

* * * * *